April 18, 1939.    L. AVORIO    2,155,074
PARACHUTE PACK WITH A SINGLE RELEASING HOOK
Filed Aug. 17, 1937    2 Sheets-Sheet 1
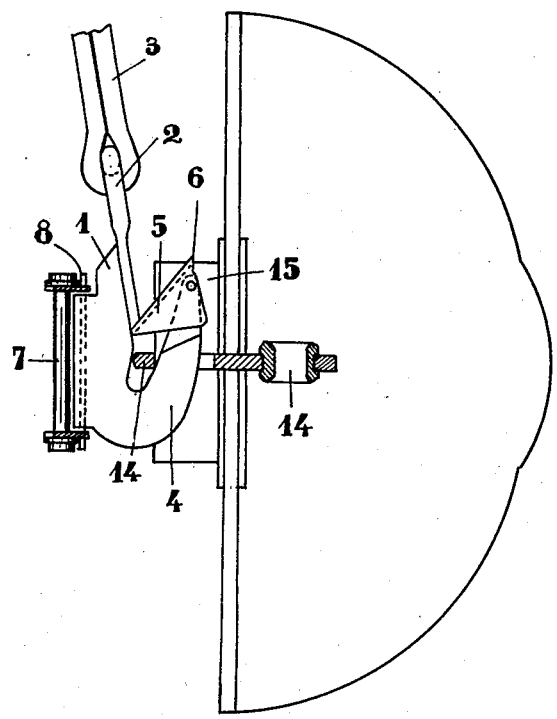
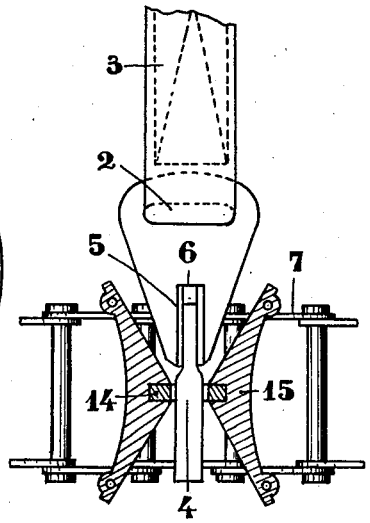
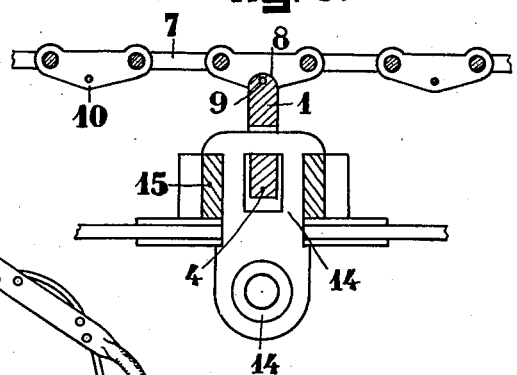
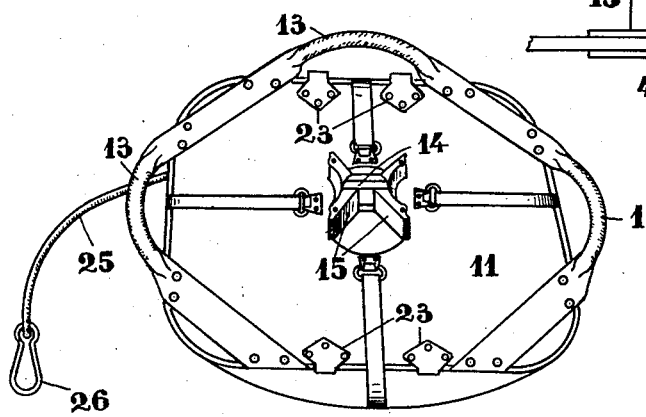
Luigi AVORIO
INVENTOR
by: Haseltine Lake & Co.
ATTORNEYS April 18, 1939. L. AVORIO 2,155,074
PARACHUTE PACK WITH A SINGLE RELEASING HOOK
Filed Aug. 17, 1937 2 Sheets-Sheet 2
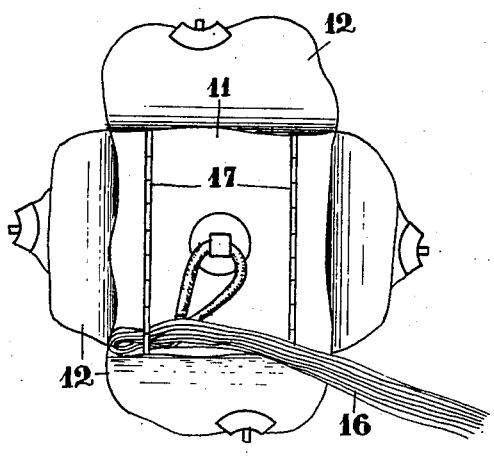
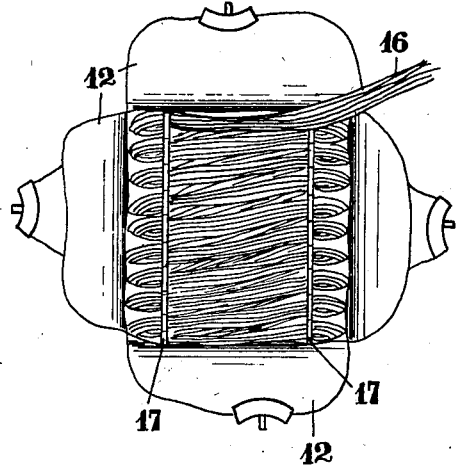
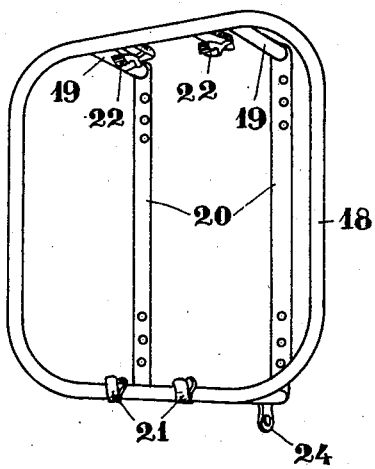
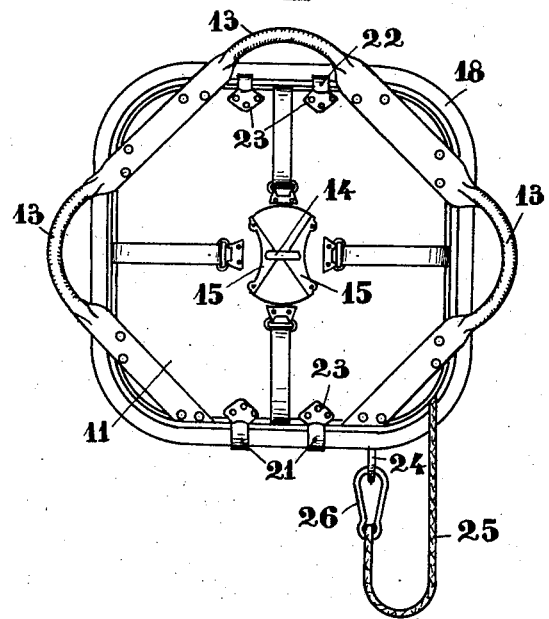
Luigi AVORIO
INVENTOR
by: Haseltine Lake & Co.
ATTORNEYS Patented Apr. 18, 1939

2,155,074

UNITED STATES PATENT OFFICE 2,155,074

PARACHUTE PACK WITH A SINGLE RELEASING HOOK

Luigi Avorio, Rome, Italy

Application August 17, 1937, Serial No. 159,467
In Italy August 17, 1936

2 Claims. (Cl. 244—148)

The present invention relates to improvements to the attachment of the parachute pack and the mounting of said pack on board of an aircraft.

Owing to the want of available space on board the aircraft, to the ever increasing duties required from the crew of the aircraft more particularly in military aircraft, the need of ever increasing the comfort of the passengers during long cruises as obtaining at present times, it is necessary that the pack containing the parachute, which is often bulky and heavy may not weigh continuously on the person who may eventually use it.

From the above considerations the detachable parachute pack has been evolved.

This type of parachute pack has however the inconvenience that it must be slung on before using it, and consequently during the few moments available for the purpose, and when this manœuvre is eventually effected in conditions of apprehension, as the leap overboard is of abnormal character and is particularly difficult.

It is therefore necessary that the slip on of the pack by the parachutist may be as simple and as rapid as possible, but that at the same time this operation should be independent from the conditions of time, space, place and size of the person wearing the parachute pack. In addition, the absolute strength and resistance of the various parts must always be secured, and the parachutist must be supported in a convenient position, while the detachment of the parachute pack is impossible unless the parachutist desires to do so when the parachute is not in use.

The object of the present invention is to provide a parachute pack which satisfies all the conditions above mentioned, which conditions may be resumed as follows:

(a) Simplicity, facility and safety of manœuvre;

(b) Independence from the body size of the person wearing the parachute and from the clothes he wear;

(c) Sufficient strength and resistance of the various parts in relation to the operation of the parachute;

(d) Impossibility of detaching unvoluntarily the parachute pack from the suspension belt or girdle;

(e) Possibility of reinstating to its initial condition the parachute pack in case the parachute has not been used.

For the purpose of fulfilling the conditions above mentioned, the parachute comprises the following principal parts:

1. Adjustable girdle, not bulky, always worn by the parachutist, on which the single hook, engaging the ring of the parachute pack, is provided;

2. Parachute container comprising the canopy, the rigging lines, the opening device, the casing, the hook ring; which parts are all placed in the:

3. Device carrying the parachute pack fixed to the aircraft.

The suspension girdle is an element known and used in modern parachutes and fully answers its purpose when it is adjustable to the body size of the parachutist. For this purpose, it is provided with a suitable adjusting device adapted to displace the hooking buckle. This may be accomplished in various ways; for example, by disposing the hooking meshes of the belt so as to form a metallic chain in which said meshes are rotatable round axes parallel to one another.

On the meshes of this chain, the hook of the pack of the parchute is fixed.

However, quite independently of the possibility of displacing the connecting hook in accordance with the body size of the parachutist, it is necessary that the hook may be single, and that it should always occupy the same relative position with respect to the body of the parachutist. Moreover, it may also be possible that the position of the hook with respect to the chain belt may be fixed, this latter being made in various dimensions depending on the different sizes of the parachutists.

The accompanying drawings show by way of example a practical form of construction of the parachute pack according to the invention; in which:

Figures 1, 2 and 3 show the hook attachment to the girdle, and also the hook hooked to the girdle respectively in side and front views and in horizontal section.

Figures 4, 5 and 6 show the parachute pack viewed respectively from the bottom side, from the top, with the open and empty casing, and from the top with the open casing and the parachute folded into it.

Fig. 7 shows a small cage adapted to contain the parachute container which is fixed on to one of the side walls of the aircraft.

Fig. 8 shows the parachute pack placed inside the small cage shown in Fig. 7, when it is fixed on a side wall.

In all the figures of the drawings like parts of the device are indicated by the same reference numerals.

The type of hook shown in Figures 1, 2 and 3 to which the parachute pack is to be hooked by means of the hooking ring carried by the parachute pack, must always be disposed on the left hand side of the parachutist, and consequently, according to the body size of the various persons, may assume various different relative positions with respect to the belt, always worn by the parachutist. This result is obtained by means of a block chain serving for the adjustment of the girdle round the body of the parachutist, as it is possible to insert the hook into any of the meshes of the adjustable chain, or even on to the end plate limiting the chain at the left hand side of the parachutist.

In order to comply with the other requirements above enumerated, the hook is permanently fixed at the end of a strap 3, of sufficiently strong character, the other end of which is fixed on to the girdle at a point corresponding to the middle of the back of the parachutist when the latter is wearing the girdle. When the parachute operates, the hook is released from the girdle, and the parachutist remains suspended, when the canopy has opened, to the right position for the descent. The hook and the suspension strap are the only elements intervening, for simplifying still further the manœuvre, and for obtaining the rotation in the air of the parachutist, as will be explained hereinafter. The strap passes on the left shoulder of the parachutist, and it could, if desired, be passed along his side.

The hook 1, comprises a metallic hook provided with a slot 2, by means of which it is fastened at the end of the strap 3. It comprises also a central portion 4, having a rectangular section with rounded corners which, when the parachute pack is hooked, fit in the slot of hooking ring 14, so as to prevent rotation of this latter.

The double cheek of the spring hook 5 is so shaped, in the portion which comes in contact with the hooking ring 14, that a little effort produced by the latter, tends to place the spring hook 5 in the locked position, and to prevent the unlocking of the pack in the case of the spring being broken. By acting inversely on the lug 6, the rotation of the spring hook 5 is produced, and the pack may be taken out.

In order that severe torsion strains may not be produced on hook 1, which must be always attached rigidly to the girdle 7, it is necessary that it may rotate round an axis 8, disposed in the plane of the hook, and fixed in a suitable position with respect to the girdle 7. The rigid connection between the hook and the girdle is necessary in order that the parachute may not detach itself from the forward connection of the girdle before the parachute has been completely taken off from the container, and only when its canopy has fully opened out, owing to the high resistance produced, the container becomes detached from the fixed forward point of the girdle. This point is placed at the left hand side of the parachutist for the two following principal reasons: firstly for obtaining the rotation of the parachutist body, so as to move him away from the riggings and from the casing of the parachute, so that during the unfolding of the canopy he may not be struck by these parts; secondly because when it is desired to operate the parachute by hand, the handle designed for this purpose may be placed in front of the parachutist and in a suitable position for exerting a pulling action on the string cutter.

These last conditions, including the rotation, are obtained by making the axis of rotation 8 with metal or with other material, suitably selected and having a calibrated section, which axis 8, is inserted in the slot 9 carried by hook 1, but the ends of which are inserted in the two slots 10, carried by the various meshes of the adjustable chain, and by the end plate of said chain, so that the hook is free to assume the most convenient position respecting the various body sizes of the parachutists.

The detachment of the container from the girdle is operated by cutting axis 8.

In the system of harness for wearing the parachutes, the hook above described may find a possible application, and the idea of providing an axis of rotation to be broken by the shock produced in opening the parachute is intended to be comprised in the present invention, also in relation to the said special disposition of the hook on the harness.

The parachute pack, as shown in Figures 4, 5, and 6, forms a unit having minimum weight and dimensions, and is provided with a rigid bottom 11, forming a portion of the whole casing of the parachute, said casing being completed by four flaps 12 of cloth which may be impermeable or not. The rigid portion carries outside three handles 13, to facilitate handling of the parachute container, and is traversed by the double hooking hook 14, which in its turn is provided with the pieces 15. The bundle of the suspension riggings 16 leading from the canopy of the parachute, is fixed to the double ring internally with respect to the rigid bottom 11, and is disposed therein in correct order by means of the elastic bands 17. On the bundle of riggings the other portions of the parachute are subsequently disposed.

The parachute pack is placed in a small cage, shown in Figs. 7 and 8, formed with a tubular metallic element 18, which may have other shapes or be made with other materials, having the same profile as the rigid bottom of the parachute pack, said small cage standing on four feet 19 forming distance pieces to keep it apart at a suitable distance from the side wall of the aircraft, on to which it is attached by means of the straps 20. Two fixed knobs 21, fixed on to the tubular element 18, provide a support to the parachute pack, which is also maintained in its right position by another two spring knobs 22 disposed in opposition with respect to the fixed knobs 21. In this way, the disposition of the parachute pack in the small cage is obtained by resting the rigid bottom 11 of the parachute pack on the fixed knobs 21, and pushing it so as to engage the spring knobs 22. As the rigid bottom 21 of the parachute pack may not be subjected to damage in correspondence with the four knobs 21 and 22, the flap is provided with four protecting plates 23. With this arrangement, the parachute pack is always ready in a well determined place.

The taking away of the parachute pack from the small cage is very easy, as it is sufficient to take it by the handle 13 and to pull it out gently, thus it is drawn out in the right way for its successive hooking, as the hooking ring 14 will be found facing the person who will have to wear the parachute, and in the right position for locking it on the hook provided on the girdle.

Lastly, the small cage carries, in a suitable position the eyelet 24 to which the restricting line 25 is fixed by means of the spring hook 26; this restricting line will always be hooked on when the parachute pack is lodged in its small cage, in this way the automatic operation of the parachute is always assured.

I claim:

1. Parachute pack comprising a canopy, rigging lines, a single hook, an opening device and a parachute hooking ring capable of being detached by means of said single hook, and a metallic chain girdle of adjustable length with which said hooking ring is capable of co-operating by said single hook being capable of hooking onto the one of the meshes of said chain girdle selected, means including a calibrated metallic shaft operatively associated with said hook and chain for constantly maintaining said hook in the same position with respect to the body size of the wearer, and said shaft allowing limited rotation of said hook, said shaft being breakable when the parachute commences to operate in order to detach said parachute pack from said chain girdle.

2. A parachute pack according to claim 1, wherein the single hook has a slot, and the calibrated metal shaft is inserted in said slot in said single hook and serves to connect the single hook to the chain girdle, and wherein corresponding slots are formed in the meshes of the chain girdle and the two ends of said shaft are inserted into said corresponding slots, so that the release of the parachute pack from the chain girdle occurs by breakage of said shaft.

LUIGI AVORIO.